March 3, 1970  G. S. PERRIN  3,497,987
ARTIFICIAL FISHING LURE
Filed May 15, 1968
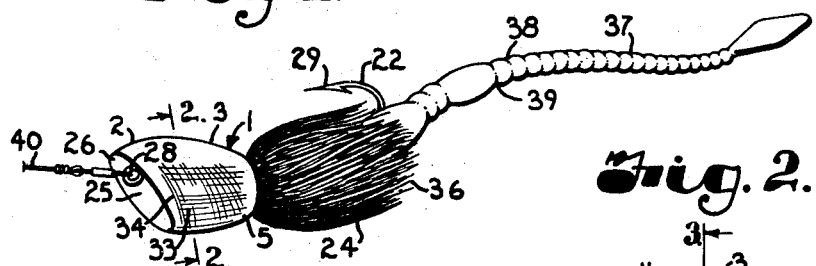
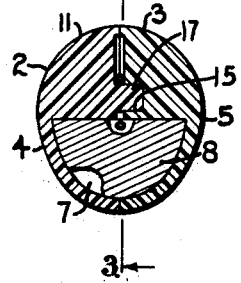
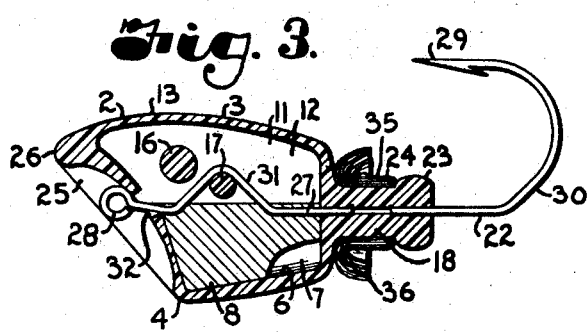
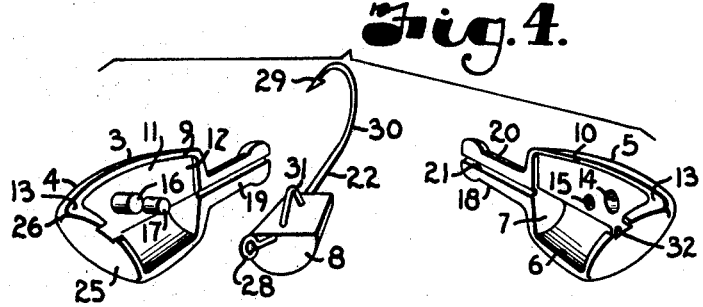
INVENTOR.
GEORGE S. PERRIN
BY
*Fishburn, Gold & Litman*
ATTORNEYS

United States Patent Office 3,497,987
Patented Mar. 3, 1970

3,497,987
ARTIFICIAL FISHING LURE
George S. Perrin, 3008 S. Dallas Drive,
Fort Smith, Ark. 72901
Filed May 15, 1968, Ser. No. 729,192
Int. Cl. A01k 85/00
U.S. Cl. 43—42.28                    10 Claims

ABSTRACT OF THE DISCLOSURE

An artificial fishing lure has a body member with a cavity therein and a weight in said cavity and an elongate hook shaft extending longitudinally through the body and a portion of the cavity. The hook shaft has an eye portion at the front end of the lure and a barbed hook portion at the rear end thereof and the weight is fixed to a portion of the hook shaft and positioned within the cavity. The body is formed from two side halves each with mating grooves and cavity forming portions for the hook shaft and weight. The hook shaft has an offset or bight portion which cooperates with locating pins and sockets in opposite side halves for positioning the hook shaft between said halves when secured together with sealed margins to enclose the hook shaft and weight. The fishing lure has a concave front face which slopes downwardly and rearwardly from a forward and upper edge of the body portion for effecting movement of the lure when pulled through water.

---

The present invention relates to an improved artificial fishing lure which is exteriorly shaped and appropriately designed and constructed to give a desired appearance which is attractive to game fish, as for example, a small fish, insect or the like and to provide an action or movement to attract game fish when pulled through water.

The principal objects of the present invention are: to provide an artificial fishing lure with a weight positioned in a body cavity and a concave inclined leading or front end that cooperate in giving action when pulled through water; to provide such a fishing lure particularly designed as a deep running lure; to provide such an artificial fishing lure having an exterior shape which when pulled through a body of water will remain substantially free from weeds and other plant growth; to provide such an artificial fishing lure which is extremly rugged, durable, and damage resistant; to provide such a lure which is precisely designed and constructed to have buoyancy and a weight distribution for action variation when pulled at different rates; to provide such a lure wherein the connection of the hook shaft and weight and arrangement with body portion positively retain the hook in fixed relation; and to provide such an artificial fishing lure which is economical to manufacture and easily maintained.

Other objects and advantages of this invention will become apparent from the following description taken in connection with the accompanying drawings wherein are set forth by way of illustration and example certain embodiments of this invention.

FIG. 1 is an elevation view of an artificial fishing lure embodying features of the present invention.

FIG. 2 is a transverse sectional view through the body portion of the fishing lure taken on line 2—2, FIG. 1.

FIG. 3 is a longitudinal sectional view of the lure taken on line 3—3, FIG. 2, showing the hook shaft and weight and body portions engaged therewith.

FIG. 4 is an exploded perspective view of the body portion particularly showing the side sections thereof.

Referring more in detail to the drawings:

The reference numeral 1 generally designates an artificial fishing lure having a body member 2 which is particularly adapted to be molded of suitable synthetic resins or the like and which may be generally round or ovate in transverse cross-sections and which as illustrated is substantially elliptical. The body member 2 as shown has an upper surface 3 that is generally convex longitudinally thereof and is formed into side sections 4 and 5 which are substantially identical in reverse with each having a mating lower chamber 6 which when together form a suitable cavity 7. The cavity 7 will provide buoyancy to the body but also is arranged to receive a weight 8 that insures a proper vertical disposition of the lure 1 when pulled through the water and aids in the lure action, as later described. It is desirable that the body member 2 be formed of a suitable light weight, economical, and moldable material, such as plastic, and that the weight 8 be of a sutable heavy formable material, such as lead, that may be molded to the desired shape, such as to conform to and fill the cavity 7.

The body 2 is preferably divided into the side sections 4 and 5 on a longitudinal center plane with the sections 4 and 5 each having inner mating surfaces 9 and 10, respectively. An upper portion 11 of each of the side sections 4 and 5 is solid with the inner portions recessed from the center plane to provide faces 12 with a flange 13 at the rear, top, and front thereof. One of the side sections, as for example, side section 5, has a pair of forward and rear bores or recesses 14 and 15, respectively, extending into the upper portion 11 thereof from the inner surface or face 12 which are shaped to receive a pair of forward and rear projections or pins 16 and 17, respectively, extending outwardly from the inner surface or face 12 of the upper portion 11 of the other side section 4. In the illustrated structure, the recesses 14 and 15 and the projections or pins 16 and 17 are not longitudinally aligned relative to the longitudinal axis of the body member 2 whereby both projections or pins 16 and 17 must be received in the respective recesses 14 and 15 to properly align the side sections 4 and 5.

The body member 2 may have different shapes to provide hook shaft support at the rear thereof. However, in the illustrated structure, the body has a generally cylindrical tail member 18 extending outwardly therefrom. This is provided by each of the side sections 4 and 5 having a rearwardly extending mating tail portion 19 and 20, respectively, each with a center groove 21 that extends longitudinally therethrough to the cavity 7 whereby when said side sections 4 and 5 are in engagement, a bore is formed which receives a portion of the shank of a hook 22. A rear end 23 of the tail member 18 is illustrated as an enlarged or abutment portion which when the mating tail portions 19 and 20 are secured together forms an abutment for retaining a skirt 24 on the tail member 18, as later described.

A front face or end 25 of the body member 2 slopes downwardly and rearwardly from a forward point 26 on the upper edge 3. The slope is preferably at an angle of approximately forty-five degrees (45°) with the longitudinal axis of the body member 2. The periphery of the front end 25 defines a substantially straight line from the forward point 26 on the upper edge 3 to a lower edge with the center portion of the front face 25 being inwardly depressed or recessed to form a concave surface for effecting an action and movement of the fishing lure 1 when pulled through water.

The hook 22 has an elongate shaft 27 with an eye portion 28 on one end and a barbed portion 29 on the other end thereof. The elongate hook shaft 27 has an upturned portion 30 adjacent the barbed portion 29 whereby the barbed portion 29 is upwardly and pointed toward the forward point 26 with the barbed portion 29 being substantially parallel with and positioned in spaced relation with the upper surface 3. This upturned hook facilitates the lure moving over bottom obstructions of a lake or stream without snagging. An offset or bight portion 31 in the hook shaft 27 adjacent the eye portion 28 is adapted to extend over and engage one of the pins or projections, as for example, the rear pin 17 with one side of the bight portion 31 extending between the forward and rear projections or pins 16 and 17. A portion of the hook shaft 27 extends through the bore formed by the grooves 21 in the tail portions 19 and 20. The cooperation between the engagement in the tail member 18 and the engagement of the offset or bight portion 31 with the rear pin 17 positions the hook 22 relative to the body member 2. When the side sections 4 and 5 are in engagement, the hook shaft 27 extends through a notch 32 in the flange 13 of the front face or end 25 of the side sections 4 and 5 and thereby positions the eye portion 28 adjacent the face 25, preferably above the longitudinal axis of the lure. It is preferable to have the eye portion 28 within the concave portion of the front face 25 so as to be hidden when viewed from the side or rear of the lure 1.

The weight 8 is molded to have a shape corresponding to the cavity 7 and filling same when placed therein with the side sections 4 and 5 secured together. The weight 8 is molded around a portion of the hook shaft 27 between the bight portion 31 and the upturned portion 30. The weight 8 having the hook shaft 27 fixed therein is placed in the lower chamber 6 of the side section 4 with the offset or bight portion 31 engaging the rear pin or projection 17, as previously described, and a portion of the hook shaft 27 is placed in the groove 21 in the tail portion 20. The side section 5 is then engaged with the side section 4 to complete the body member 2 and fix the hook 22 and weight 8 therein, the bond between the hook shaft and the weight aiding in locating and retaining the hook in place and distributing force applied to the hook to different parts of the body.

It is desirable to secure the side sections 4 and 5 together with a suitable adhesive in addition to the cooperative engagement of the projections or pins 16 and 17 within the bores recesses 14 and 15, respectively. Therefore, the adhesive is placed in the space formed between the inner mating surfaces 9 and 10 of the upper portions 11 of the side sections 4 and 5.

After the side sections 4 and 5 are secured together the exposed surfaces of the body member 2 and hook 22 are suitably finished. A preferred finish is metallized as being painted with aluminum paint to present a light-reflecting surface to game fish. The convex upper edge or surface 3 is painted a color which has been found to be attractive to game fish, such as yellow or a yellow having a green tint. It is preferred to finish the concave front end or face 25 with a dark color resembling the open mouth of a small fish, eel or the like, such as being painted a dark red. Sides of the body member 2 contain a plurality of intersecting groups of ridges 33 and 34 with one group of the ridges, as for example, the ridges 33, being substantially parallel with the longitudinal axis of the body member 2 and the other group of ridges 34 intersecting the one group of ridges 33 at an angle thereby providing a prismatic finish which reflects light received from substantially every angle. In the illustrated structure, the ridges 34 are approximately parallel to the slope of the front face or end 25.

The skirt 24 is illustrated as including a sleeve portion 35 for mounting on the tail member 18 and having one end engaging the enlarged portion of the rear end 23 of the tail member 18 and including a plurality of tentacles 36 at the other end of the skirt 24. It is preferable to form the skirt 24 of a suitable flexible resilient material, such as rubber, and to have several layers with each being cut into a plurality of narrow strips to form the tentacles 36 which extend rearwardly from the rear end 23 of the body member 2 when the lure 1 is pulled through the water, thereby substantially concealing the barbed portion 29 of the hook 22. The tentacles 36 wave or move in the water in response to movement of the water or currents therein thereby visually attracting game fish.

In addition to the skirt 24, an artificial worm or eel 37 may be threaded on the hook 22 to represent a larger creature to attract the game fish. It is desirable to mount the worm or eel 37 so that the portion engaging the upturned portion 30 of the hook 22 extends substantially at a forty-five degree (45°) angle with the hook shaft 27 and the longitudinal axis of the body member 2 whereby the hook 22 emerges from the worm or eel 37 at a point approximately midway in the upturned portion 30. It is also desirable to have the worm or eel 37 formed of a suitable soft, light-weight, resilient material having a slimy feel to the touch, such as a soft plastic thereby having a surface feeling substantially similar to surfaces of fish, fish eggs, worms, bugs and the like. In the illustrated structure, the surface of the worm or eel 37 is molded to resemble a plurality of joints 38 separating a plurality of body sections 39.

To prepare the fishing lure 1 for use, a suitable fishing line 40 is attached to the eye portion 28 of the hook 22. A darting like motion or action of the lure 1 is effected by alternately pulling on and relaxing the pull on the fishing line 40. The water exerts an upward force on the front face or end 25 when the lure 1 is pulled therethrough, thereby urging same upwardly while the lure is being pulled. However, the weight 8 urges the lure downwardly through the water when the pulling force 1 is relaxed whereby pulling and pausing effects a natural movement in the water.

The fishing lure 1 is extremely effective and versatile in that it can be fished with the skirt 24 only and with the worm or eel 37 also in place. The fishing lure is also effective at various depths, as for example: in shallow water it is desired to use a fast retrieve over weeds and shallow banks; in medium depth water is desirable to allow the fishing lure 1 to sink to the desired depth and retrieve same slowly with short pauses; and in deep water it is desirable to allow the lure 1 to sink to the bottom of the body of water and to retrieve same slowly with long pauses and to raise and lower a fishing rod tip (not shown) to give a jigging action to the lure. The retrieving action causes the fishing lure 1 to rise or dart through the water by the action of the water against the concave front face 25 and the pauses effect a lowering of the lure 1 through the water by action of the weight 8.

It is to be understood that while I have illustrated and described one form of my invention, it is not to be limited to this specific form or arrangement of parts herein described and shown.

What I claim and desire to secure by Letters Patent is:
1. An artificial fishing lure comprising:
 (a) an elongate hook shaft having an eye portion at one end and a barbed portion at the other end,
 (b) said hook shaft having an offset portion intermediate the ends thereof,
 (c) an elongate body member having said offset portion of said hook shaft mounted therein, said body member having a cavity therein in a lower portion thereof, said body member having a concave face at a front end thereof for effecting movement of the lure through water,
 (d) said body member is formed of side sections with a first side section having a pair of spaced recesses in an upper portion and a second side section having a pair of spaced projections from an upper portion mating with said respective recesses thereby positioning said side sections,
 (e) a weight in said body member cavity whereby the lure moves downwardly through a body of water,
 (f) an outwardly extending flange around the periphery of said first side section and said second side section thereby spacing said side sections apart,

(g) an adhesive placed in said spacing between said side sections for securing same together with said hook shaft held therebetween.

2. An artificial fishing lure comprising:
(a) an elongate hook shaft having an eye portion at one end and a barbed portion at the other end,
(b) said hook shaft having an offset portion intermediate the ends thereof,
(c) an elongate body member having said offset portion of said hook shaft mounted therein, said body member having a cavity therein in a lower portion thereof, said body member having a concave face at a front end thereof for effecting movement of the lure through water,
(d) said body member is formed of side sections with a first side section having a pair of spaced recesses in an upper portion and a second side section having a pair of spaced projections from an upper portion mating with said respective recesses thereby positioning said side sections,
(e) a weight in said body member cavity whereby the lure moves downwardly through a body of water,
(f) said hook shaft offset portion extends between said projections and over one of said projections,
(g) said hook shaft having a portion extending through said body cavity, and
(h) said weight is fixed to the hook shaft portion in the body cavity.

3. The fishing lure as set forth in claim 2 including:
(a) a tail portion extending outwardly from a rear end of said body member, and
(b) a bore through said tail portion to said cavity for receiving the hook shaft portion extending therefrom.

4. The fishing lure as set forth in claim 3 wherein:
(a) said concave front face slopes downwardly and rearwardly from a forward point on an upper edge thereof whereby the lure moves upwardly and downwardly when pulled through water.

5. An arificial fishing lure comprising:
(a) an elongate hook shaft having an eye portion at one end and a barbed portion at the other end thereof, said hook shaft having an upturned portion adjacent said barbed portion whereby same is positioned above said shaft;
(b) a body member having said hook shaft mounted therein, said body member having a cavity in a lower portion thereof, said body member having a concave front face for effecting movement of the lure when pulled through the water, said face sloping downwardly and rearwardly from a forward point on an upper edge thereof, said eye portion of said hook shaft being within said concave front face;
(c) a weight in said body member cavity whereby the lure moves downwardly through water, said weight having said hook shaft extending therethrough and fixed thereto;
(d) a tail portion having one end mounted on said body member, said tail portion extending outwardly from said body member at a rear end thereof, said tail portion having a bore therethrough for receiving said hook shaft, said tail portion having an enlarged portion at the other end thereof; and
(e) a skirt mounted on said tail portion.

6. The artificial fishing lure as set forth in claim 5 wherein:
(a) said body member is formed of side sections with a first side section having a pair of spaced recesses in an upper portion thereof and a second side section having a pair of corresponding projections extending outwardly from an upper portion thereof mating with said respective recesses, and
(b) said tail portion is formed of side sections each having an elongate groove forming a portion of said bore.

7. The artificial fishing lure as set forth in claim 6 including:

(a) an outwardly extending flange around the periphery of said first side section and said second side section thereby spacing said side sections apart, said flanges each having a notch at said front face with said hook shaft extending therethrough;
(b) an adhesive placed in the space between said side sections for securing same together with said hook shaft held therebetween;
(c) an offset portion in said hook shaft intermediate the ends thereof, said hook shaft offset portion extending between said projections and over one of the projections.

8. The artificial fishing lure as set forth in claim 7 wherein:
(a) said body member is substantially elliptical in transverse cross-section, and
(b) an upper edge of said body member is generally convex in longitudinal cross-section.

9. An artificial fishing lure comprising,
(a) an elongate body having a general appearance of a small fish, said body being of two sections divided on a substantially central longitudinal plane, said body having a cavity in a lower portion thereof,
(b) a hook member having a shaft extending longitudinally through the body and a barb rearwardly of the body and an eye at the forward end thereof, said hook shaft extending through said cavity,
(c) a weight in said cavity and fixed to the hook shaft extending therethrough,
(d) cooperating interengaging means on the body sections for positioning same in mating alignment, and
(e) means securing the body sections together with the weight and hook shaft therein.

10. An arificial fishing lure comprising:
(a) an elongate hook shaft having an eye portion at one end and a barb portion at the other end thereof, said hook shaft having an upturned portion adjacent said barb portion whereby same is positioned above said shaft,
(b) a body member having said hook shaft mounted therein, said body member having a cavity in a lower portion thereof, said body member having a front face for effecting movement of the lure when pulled through the water, said eye portion of said hook shaft being adjacent said front face,
(c) a weight in said body member cavity whereby the lure moves downwardly through water,
(d) a tail portion having one end mounted on said body member, said tail portion extending outwardly from said body member at a rear end thereof, said tail portion having a bore therethrough for receiving said hook shaft,
(e) a skirt mounted on said tail portion and extending therefrom around the hook portion rearwardly thereof.

References Cited

UNITED STATES PATENTS

| | | | |
|---|---|---|---|
| 1,801,940 | 4/1931 | Stanley | 43—42.28 |
| 2,224,389 | 12/1940 | Haselwood | 43—42.35 X |
| 2,480,580 | 8/1949 | Hopkins | 43—42.34 X |
| 2,736,125 | 2/1956 | Perkins | 43—42.34 |
| 2,933,846 | 4/1960 | Garner | 43—42.35 |
| 3,390,938 | 7/1968 | Gansz | 43—42.35 X |

FOREIGN PATENTS 1,025,393   1/1953   France.

SAMUEL KOREN, Primary Examiner

DANIEL J. LEACH, Assistant Examiner

U.S. Cl. X.R.

43—42.34, 42.35, 42.37, 42.39, 42.53